US012513124B2

United States Patent
Takahashi et al.

(10) Patent No.: US 12,513,124 B2
(45) Date of Patent: *Dec. 30, 2025

(54) MULTI-INDEPENDENT LEVEL SECURITY FOR HIGH PERFORMANCE COMPUTING AND DATA STORAGE SYSTEMS

(71) Applicant: SECTURION SYSTEMS, INC., Centerville, UT (US)

(72) Inventors: Richard J. Takahashi, Layton, UT (US); Timothy Paul Abel, Fruit Heights, UT (US); Benjamin Kirk Nielson, West Haven, UT (US)

(73) Assignee: SECTURION SYSTEMS, INC., Centerville, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,554

(22) Filed: Mar. 21, 2024

(65) Prior Publication Data

US 2024/0380738 A1    Nov. 14, 2024

Related U.S. Application Data

(63) Continuation of application No. 17/506,926, filed on Oct. 21, 2021, now Pat. No. 11,968,187.

(60) Provisional application No. 63/104,795, filed on Oct. 23, 2020.

(51) Int. Cl.
   *H04L 9/40* (2022.01)
(52) U.S. Cl.
   CPC ............ *H04L 63/0428* (2013.01); *H04L 9/40* (2022.05)
(58) Field of Classification Search
   CPC .............................. H04L 63/0428; H04L 9/40

USPC .......................................................... 713/166
See application file for complete search history.

(56) References Cited

U.S. PATENT DOCUMENTS

| 6,304,973 | B1 | 10/2001 | Williams |
| 6,598,161 | B1 | 7/2003 | Kluttz et al. |
| 7,069,437 | B2 | 6/2006 | Williams |
| 7,191,341 | B2 | 3/2007 | Paaske |
| 7,362,868 | B2 * | 4/2008 | Madoukh ............ H04L 63/045 713/165 |
| 7,836,490 | B2 | 11/2010 | Smith |

(Continued)

FOREIGN PATENT DOCUMENTS

WO    2017/074887    5/2017

OTHER PUBLICATIONS

Korean Intellectual Property Office; PCT International Search Report, issued in connection to application No. PCT/US2021/055956; Feb. 7, 2022; 5 pages; Korea.

(Continued)

*Primary Examiner* — Amare F Tabor
(74) *Attorney, Agent, or Firm* — Greenberg Traurig LLP

(57) ABSTRACT

Systems, methods, and apparatus for a MILS HPC, data storage system (DSS) system architecture that incorporates a multi-crypto module (MCM) to provide end-to-end multi-independent level security (MILS) protection. Configuration of each MCM enables a high performance computing (HPC) resource to compute different security domains with the associated security level keys from a key/node manager. The HPC resource can be dynamically re-allocated to different security level domain(s) by the key/node manager. In one embodiment, the DSS stores encrypted data regardless of the domains.

20 Claims, 9 Drawing Sheets

(56) References Cited

U.S. PATENT DOCUMENTS

| | | | |
|---|---|---|---|
| 7,954,138 B2* | 5/2011 | LiVecchi | H04L 63/105 |
| | | | 726/4 |
| 7,958,351 B2 | 6/2011 | Luthl | |
| 7,979,895 B2* | 7/2011 | Farrell | H04L 63/105 |
| | | | 726/4 |
| 8,219,799 B1 | 7/2012 | Lucchesi | |
| 8,230,207 B2 | 7/2012 | Iyer et al. | |
| 8,479,304 B1 | 7/2013 | Clifford | |
| 8,539,571 B2 | 9/2013 | Smith | |
| 8,712,044 B2* | 4/2014 | MacMillan | H04L 9/3239 |
| | | | 380/278 |
| 8,806,204 B2* | 8/2014 | Chambers | G06F 21/00 |
| | | | 713/168 |
| 9,317,718 B1 | 4/2016 | Takahashi | |
| 9,524,399 B1 | 12/2016 | Takahashi | |
| 9,559,842 B2* | 1/2017 | Baldwin | H04L 9/083 |
| 9,628,274 B1 | 4/2017 | Jenks | |
| 9,660,970 B1 | 5/2017 | Rubin | |
| 9,847,878 B2 | 12/2017 | Stella | |
| 9,866,375 B2* | 1/2018 | Reilly | H04L 9/16 |
| 10,114,766 B2 | 10/2018 | Takahashi | |
| 10,193,690 B1 | 1/2019 | Self | |
| 10,467,437 B2* | 11/2019 | Couillard | G06F 21/76 |
| 10,708,236 B2 | 7/2020 | Takahashi | |
| 11,087,028 B2* | 8/2021 | Jain | G06F 21/6245 |
| 11,356,271 B2* | 6/2022 | Madden | H04L 9/3242 |
| 11,468,178 B1 | 10/2022 | O'Dell | |
| 11,968,187 B2 | 4/2024 | Takahashi et al. | |
| 2003/0005331 A1 | 1/2003 | Williams | |
| 2003/0225896 A1 | 12/2003 | Jain | |
| 2005/0097357 A1 | 5/2005 | Smith | |
| 2005/0154921 A1* | 7/2005 | Medvinsky | G06F 21/10 |
| | | | 726/4 |
| 2005/0169463 A1 | 8/2005 | Ahn | |
| 2008/0181406 A1 | 7/2008 | Iyer et al. | |
| 2008/0288782 A1 | 11/2008 | Iyer | |
| 2009/0034734 A1 | 2/2009 | Owens et al. | |
| 2009/0046858 A1 | 2/2009 | Iyer et al. | |
| 2011/0087889 A1 | 4/2011 | Iyer et al. | |
| 2011/0283339 A1 | 11/2011 | Smith | |
| 2012/0066509 A1 | 3/2012 | Lapp et al. | |
| 2015/0074409 A1 | 3/2015 | Reid et al. | |
| 2015/0222604 A1 | 8/2015 | Ylonen | |
| 2016/0205110 A1* | 7/2016 | Roth | G06F 9/455 |
| | | | 726/7 |
| 2017/0063811 A1 | 3/2017 | Hitchcock | |
| 2017/0075821 A1 | 3/2017 | Takahashi | |
| 2017/0118180 A1 | 4/2017 | Takahashi | |
| 2017/0272247 A1 | 9/2017 | Johansson | |
| 2017/0359317 A1 | 12/2017 | Anderson et al. | |
| 2018/0191691 A1 | 7/2018 | Smith | |
| 2019/0050348 A1 | 2/2019 | Takahashi et al. | |
| 2021/0160285 A1* | 5/2021 | Smith | G06F 21/602 |
| 2022/0286439 A1 | 9/2022 | Takahashi | |

OTHER PUBLICATIONS

Korean Intellectual Property Office; PCT Written Opinion of the International Searching Authority, issued in connection to application No. PCT/US2021/055956; Feb. 7, 2022; 5 pages; Korea.

* cited by examiner

MULTI-INDEPENDENT LEVEL SECURITY FOR HIGH PERFORMANCE COMPUTING AND DATA STORAGE SYSTEMS

RELATED APPLICATIONS

This is a continuation application of U.S. Non-Provisional application Ser. No. 17/506,926, filed Oct. 21, 2021, entitled "MULTI-INDEPENDENT LEVEL SECURITY FOR HIGH PERFORMANCE COMPUTING AND DATA STORAGE SYSTEMS" by Takahashi et al., which itself claims priority to U.S. Provisional Application Ser. No. 63/104,795, filed Oct. 23, 2020, entitled "MULTI-INDEPENDENT LEVEL SECURITY FOR HPC AND DATA STORAGE SYSTEM ARCHITECTURE OVER ETHERNET NETWORK," by Takahashi et al., the entire contents of which applications are incorporated by reference as if fully set forth herein.

FIELD OF THE TECHNOLOGY

At least some embodiments disclosed herein relate to computing systems and data storage systems in general, and more particularly, but not limited to multi-level security for such systems (e.g., systems having devices that communicate over Ethernet networks).

BACKGROUND

Existing military-intelligence and other secure computing systems require physically isolated, protected data storage sites for each level of classified data. This requires separated storage systems for each level of classified data. This is a costly method to store data and access data. In addition, sharing cross-domain information (e.g., sharing data between classified systems) is slow and cumbersome in a world where minutes can make a significant difference in the results achieved.

BRIEF DESCRIPTION OF THE DRAWINGS

The embodiments are illustrated by way of example and not limitation in the figures of the accompanying drawings in which like references indicate similar elements.

DETAILED DESCRIPTION

The following disclosure describes various embodiments for multi-level independent security as implemented in computing systems (e.g., high performance computing (HPC) systems and/or data storage systems (DSS)). At least some embodiments herein relate to configuring secure (e.g., multiple secured levels) communications over networks between hardware devices in such systems (e.g., Ethernet networks).

Procuring and maintaining compute, storage, and networking resources for each isolated security domain in a computing or data storage system is costly and redundant. This can cause technical problems including the need for excessive hardware, complicated procedures, and/or inefficiency or unreliability in operation. This can reduce system performance and/or lead to a failure of systems in some cases.

Various embodiments described herein provide a technological solution to the above and other problems. In one embodiment, a multi-level security architecture allows dynamic security provisioning of HPC compute resources, as well as a method to securely share the same physical data storage and network hardware. This architecture uses one or more multi-crypto modules (MCMs). This is accomplished by providing a coupling of a compute resource, which has the ability to be completely sanitized, with a trusted MCM. The MCM only decrypts and passes on data/information that the MCM is keyed for, and only if the data/information passes an integrity check. In one embodiment, the compute resource obtains all data from an encrypted trusted source. This data includes, but is not limited to, boot code, operating systems, applications, and/or communications with other nodes.

In various embodiments, an MCM is a device that encrypts all data types that are input to the MCM according to the detected application metadata. In one embodiment, each application requires corresponding cipher, keys, and sensitivity to protocol metadata. In one embodiment, any undetermined data type can be handled through rejection, or a default encryption cipher, key, and metadata handling scheme.

Figure 1:
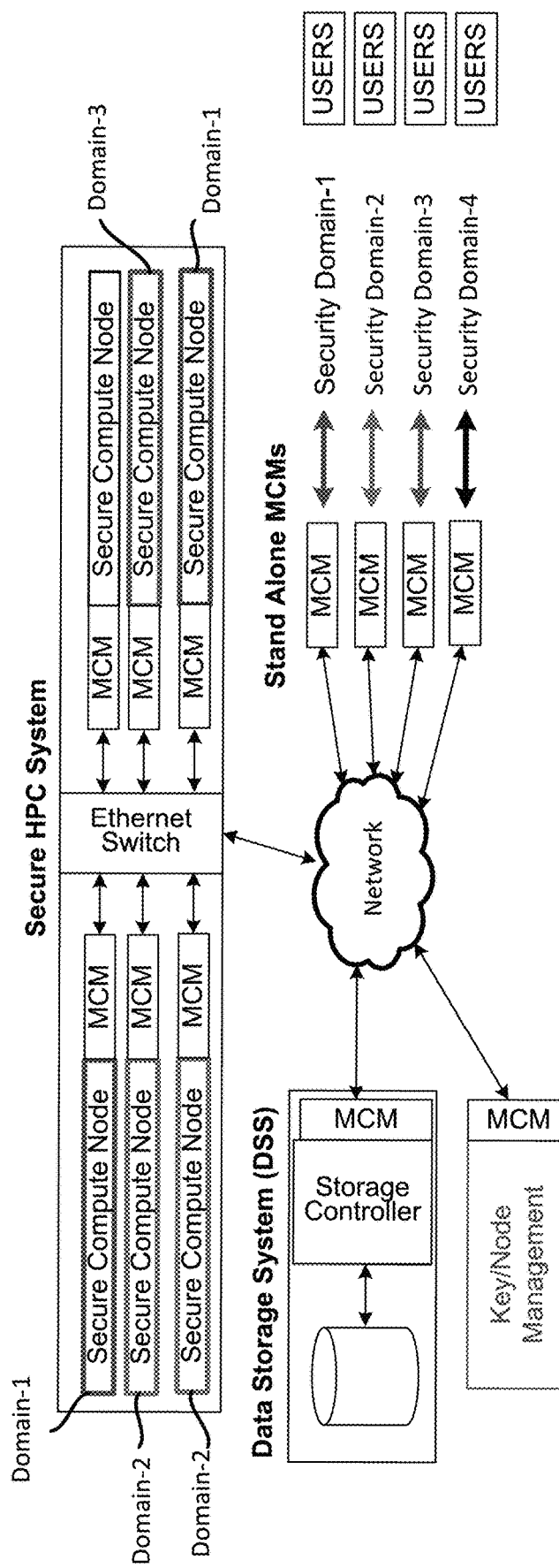
FIG. 1 shows a system architecture for an HPC and DSS system that uses multiple-cryptographic modules (MCMs) (sometimes simply referred to as "multi-crypto modules"), in accordance with some embodiments.

FIG. 1 shows a block diagram for a MILS HPC data storage system (DSS) system architecture that incorporates the MCM to provide an end-to-end multi-independent level security (MILS) protection. Configuration of each MCM enables nodes within the single HPC resource to compute different security domains with the associated security level keys from a key/node manager. The HPC resource can be dynamically re-allocated to one or more different security level domain(s) by the key/node manager. In one embodiment, the DSS only stores encrypted data regardless of the domains.

Re-allocation is accomplished by command from the node manager through a secure connection to the node. When reallocation is commanded, a clearing procedure occurs (sanitization), followed by an identity assignment. Based on the identity assignment, keys can be distributed to the MCM in the node allowing the node to communicate with other components of like identity assignment.

In one embodiment, a system uses a MACsec appliance and a file and block-level data at rest encryptor (DARE), each supporting data rates of, for example, 100 Gbps or greater. In one example, this network and encryption technology can be scaled up to 400 Gbps, or to terabit speeds. These components can be consolidated into the multi-crypto module to provide both data-at-rest and data-in-transit encryption.

Figure 2:
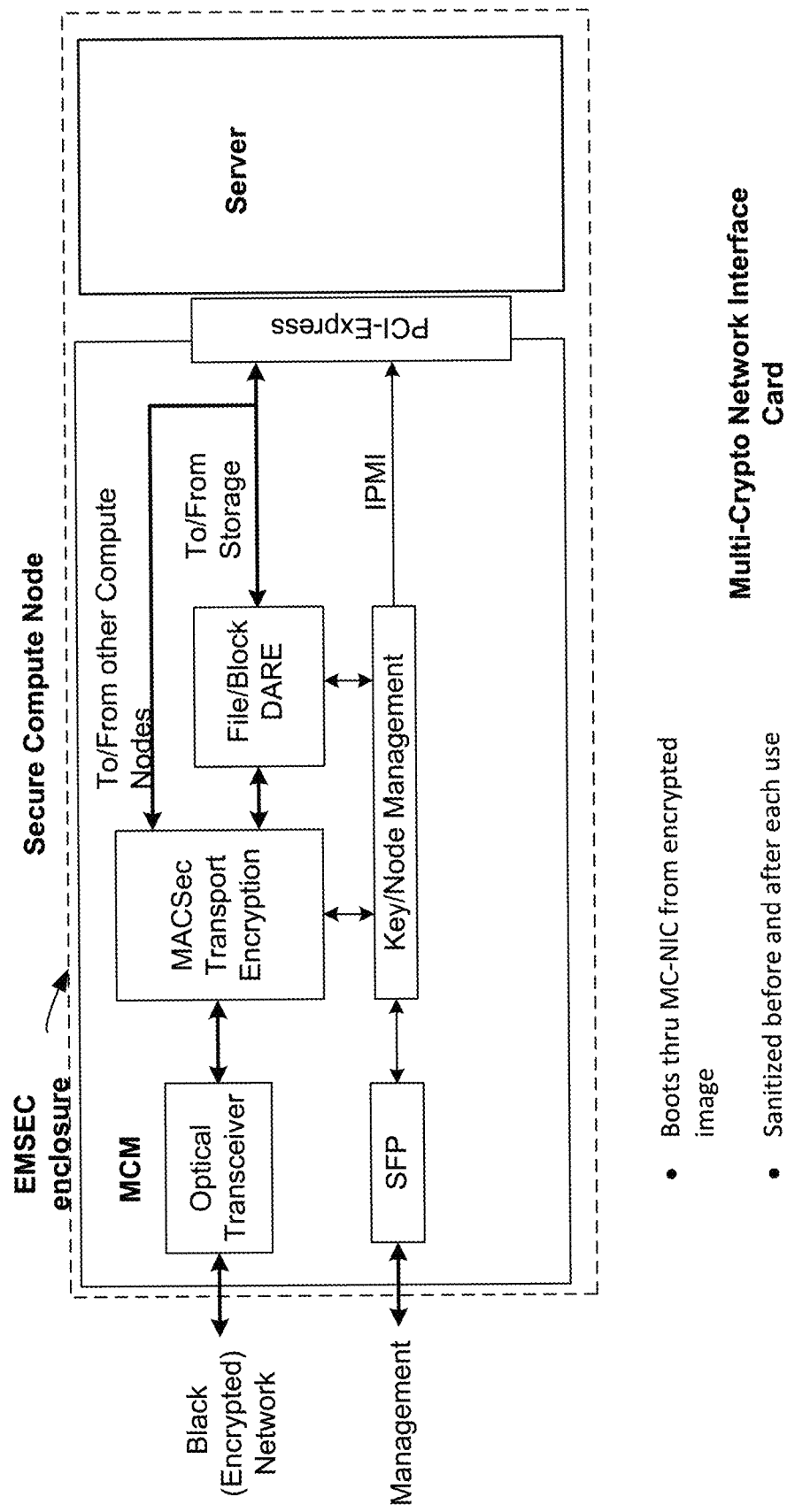
FIG. 2 shows a secure compute node with a multiple cryptographic module (MCM), in accordance with some embodiments.

The multi-crypto module (MCM) is a component used as a cryptographic processing element in the system. It can be built as a network interface card in a PCIe form factor as shown in FIG. 2. The MCM provides high-speed I/O over PCIe to the server, high-speed Ethernet to the black network, and additional ports for keying and remote management. In one embodiment, the MCM provides a hardware-enforced, EMSEC-enclosed information assurance and cryptographic boundary consisting of MACsec and the data at rest encryptor (DARE) to create a secure, provisioned enclave. The MACsec functionality provides confidentiality and integrity as it establishes a secure Ethernet tunnel with other nodes provisioned into a specific domain. Other transport encryption protocols such as IPSec, or TLS can also be supported. The MCM has access to the server through IPMI to sanitize the system when deprovisioning or changing security levels (e.g. clear volatile RAM contents, reboot the system, verify sanitization, load a new operating system, etc.).

SFP as illustrated in FIG. 2 represents a small form-factor pluggable transceiver. In one example, this is an industry standard modular slot for a media specific transceiver. The SFP is one of various other interfaces that can be used.

Figure 3:
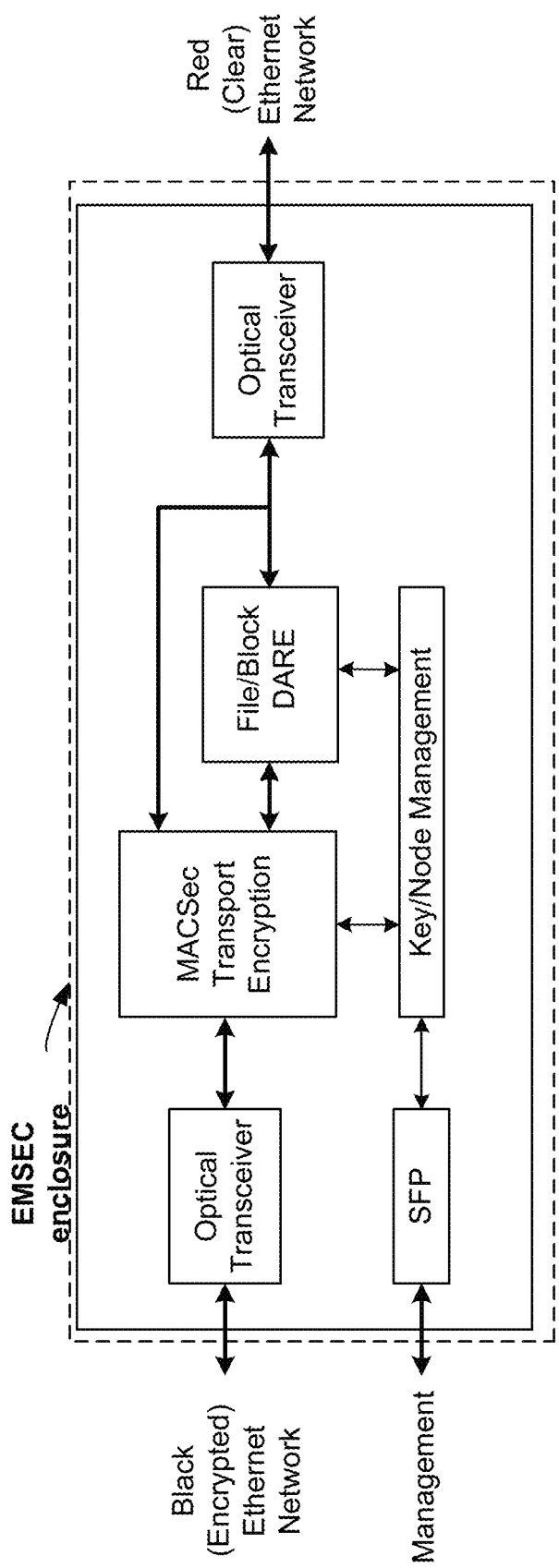
FIG. 3 shows a stand-alone MCM, in accordance with some embodiments.

In one embodiment, the MCM DARE is a file and block-level encryptor that encrypts individual files over network filesystems such as NFS or CIFS, or blocks over iSCSI. Block-level encryption allows any filesystem to be used on the server and still provide confidentiality. Any file or data transfer through the MCM is encrypted before it reaches the black network. The multi-crypto module can be instantiated as a network card interfacing with a computer's native I/O interface (e.g., PCI-Express) as shown in FIG. 2, or instantiated as a standalone unit that provides an Ethernet interface on the red side, as shown in FIG. 3. The key/node management can be done through either the black network or a separate management interface as shown in FIG. 2 and FIG. 3.

In one embodiment, the key/node manager contains the primary MCM and has connectivity to all other MCMs in the MILS system. This node is responsible for provisioning each MCM to the configured security level, providing or activating appropriate device credentials, and managing keys for MACsec and DARE. Once an MCM has credentials matching the provisioned security level, it can request keys over the network. In one example, KMIP will be used to get keying material from an HSM (e.g., hardware security module). In one example, the KMIP is a Key Management Interoperability Protocol, which is a communication protocol for manipulating keys on a key management server. In other examples, other key management protocols can be used. In one example, the key manager uses a key communication protocol other than KMIP.

In one embodiment, the data storage system (DSS) consists of a COTS storage controller with an MCM to provide MACsec connectivity to each of the security levels in the system. Before data is received at the DSS, the DARE functionality of the originating MCM will have encrypted the data with a key unique to the provisioned security level. This provides the cryptographic separation of the MILS data that can then be written to the shared storage media. The MCM allows for multiple MACsec connectivity associations for each security level, which in turn provides a redundant check to ensure data separation.

In one embodiment, the secure HPC system consists of multiple servers installed with the MCM designated as the "Secure Compute Node" in FIG. 2. These servers contain no non-volatile memory, and for example, PXE boot from the DSS. Each node in the secure HPC system can be allocated and provisioned as needed for computational load at each security domain. The MCM will perform the DARE and MACsec functions. The MACsec functionality provides a secure link to other nodes at the same security level and to the DSS. The DARE functionality encrypts data on the way to the DSS and decrypts it on the way back. Each HPC secure compute node in the cluster is sanitized directly after use through the IPMI function by removing the power to clear all of the volatile memory components contained in the node and verify the compute node is in a sanitized state.

Various examples of tracing data through the MILS HPC DSS System are now described below.

1. User Terminal through MCM to the DSS: A user's file is transmitted from a security domain to the MCM. The MCM recognizes the file as one of the storage file types and encrypts it using the DARE function. The encrypted file is then transferred through the secure MACsec tunnel to the DSS. The encrypted file is then written to the storage media.

2. User Terminal through MCM to the HPC System: A user's data is transmitted to the MCM, and then to the HPC node through the MACsec tunnel.

3. HPC System to DSS: An HPC file is sent to the MCM over PCIe. The MCM recognizes the file as one of the storage file types and encrypts it using the DARE function. The encrypted storage file is then passed to the DSS through the MACsec tunnel. The encrypted file is then written to the storage media.

In various embodiments, a MILS HPC DSS system uses the MCM design above. This system leverages, for example, 100 Gbps DARE and 100 Gbps MACSec components for use with the MCM, which enables a dynamically-reallocated HPC center and single data storage system. The system includes MCMs, HPC, DSS, and a key manager system.

In one embodiment, the key/node manager configures each MCM through a secure out-of-band connection. In one example, there are three actions performed by the key/node manager each time a node is reallocated. First, a clearing procedure is commanded, next an identity is assigned, and finally keys are issued to the MCM.

Figure 4:
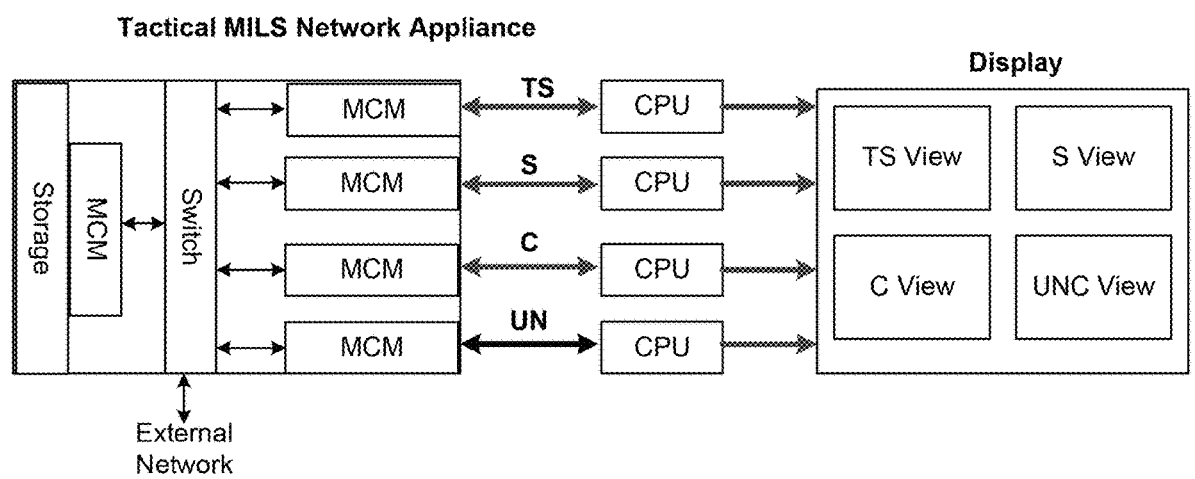
FIGS. 4-9 show various embodiments that implement the above system architecture.

FIG. 4 shows an example application for the MILS network appliance as a cross-domain viewer (e.g., presented on a user display of a computing device, as illustrated). In this embodiment, a local storage is preloaded with encrypted information over an external network. Multiple MCM elements are then used to provide cryptographic isolation between CPUs at different classification levels, yet sharing a single encrypted data store.

Figure 5:
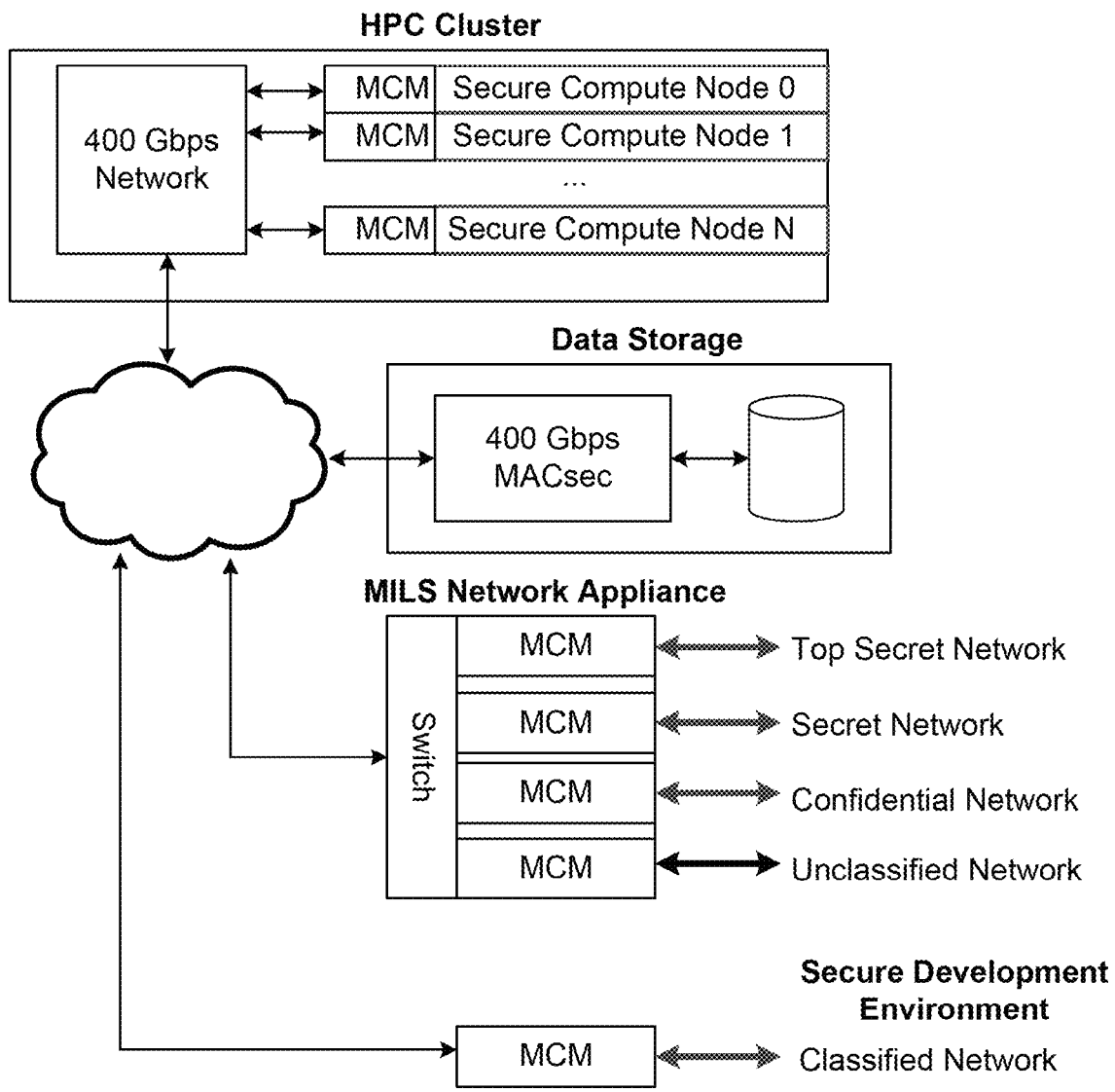

FIG. 5 shows an example network with multiple MCM applications working to form a secure multi-level security data center with application connections. In this embodiment, HPC cluster nodes can be assigned to different networks while networking, infrastructure, and storage are shared. The MCM maintains cryptographic network isolation and cryptographic isolation between data elements on the data storage unit (e.g., a data repository managed by a computing device). This allows elements to be geographically distanced, while maintaining strong cryptographic security.

Figure 6:
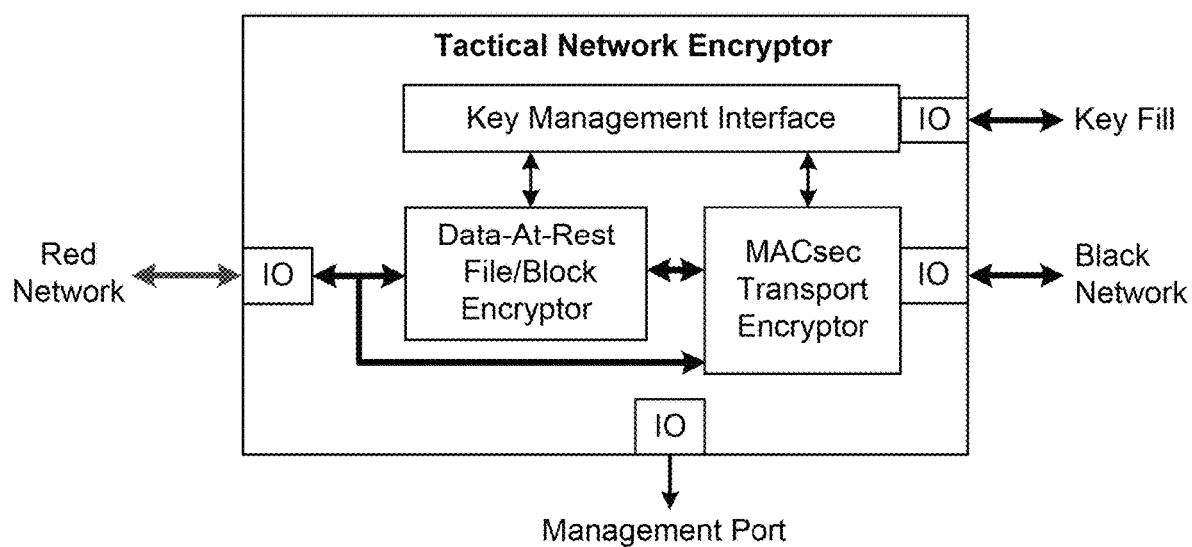

FIG. 6 shows a detailed view of a tactical network encryptor. In this embodiment, the MCM low speed interfaces (e.g., 10 Mbps to 1 Gbps) are used for the red and black network interfaces. Key fill can be done through either the red network, black network, or a dedicated key fill interface. This allows for a significantly smaller unit that can be used in space and weight-constrained situations.

Figure 7:
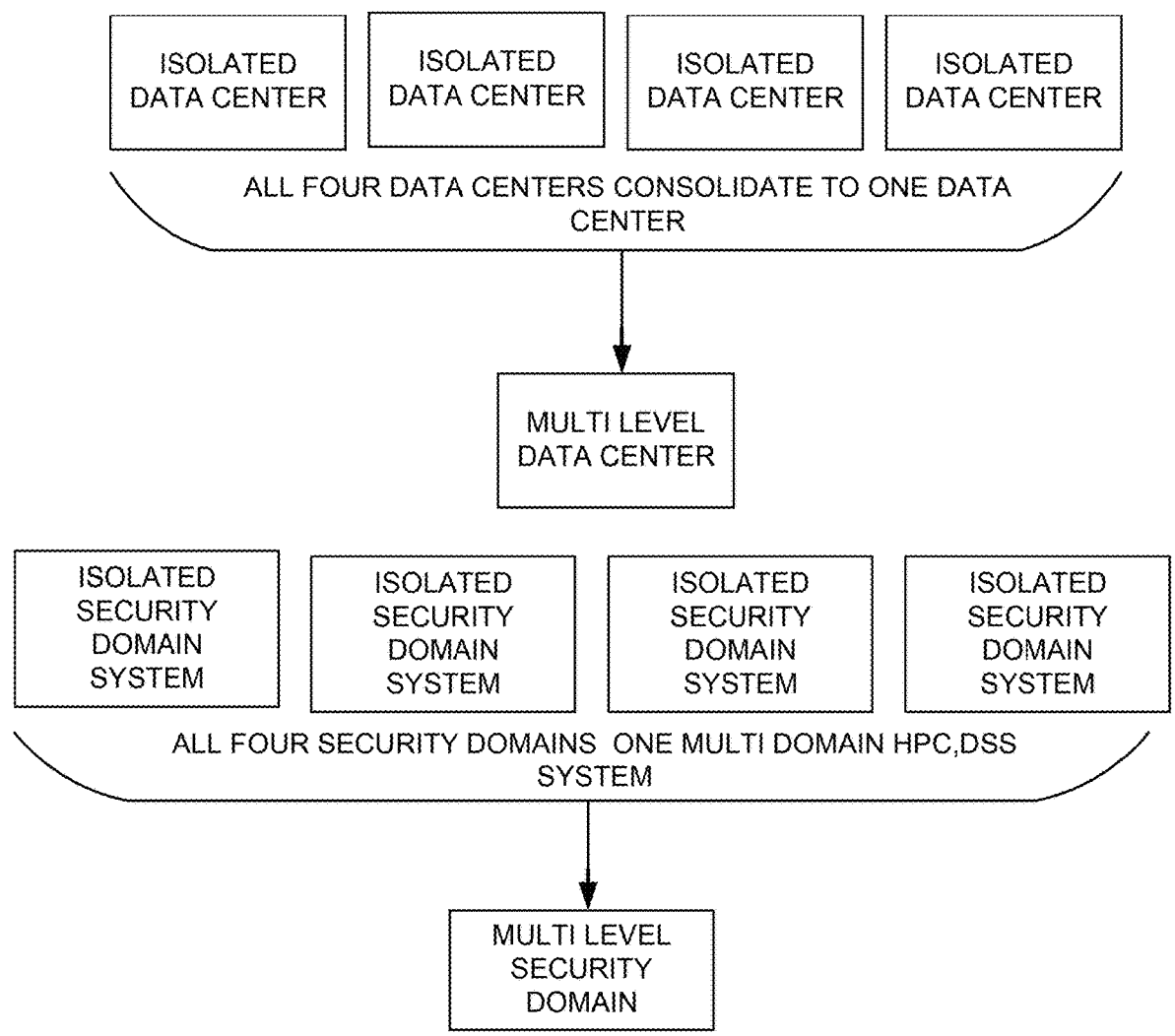

FIG. 7 shows a single multi-level data center that can be used to replace any number of traditionally-isolated security domain data centers including isolated high performance computing systems. Because peak loads can be shared in the multi-level data center, the amount of resources required in the multi-level data center is less than the aggregate amount of resources required in isolated data centers. This results in capital and/or recurring cost savings.

Figure 8:
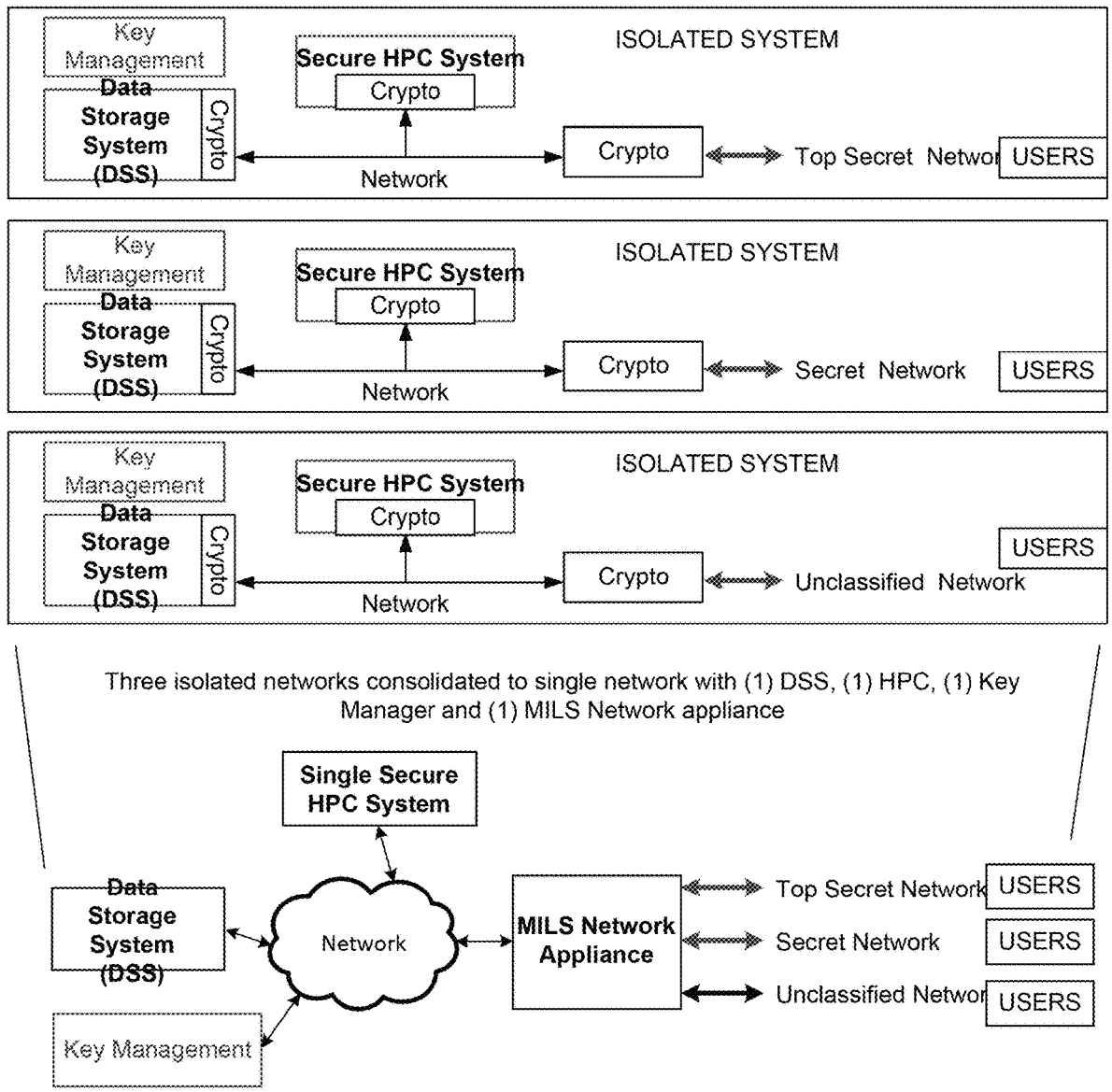

FIG. 8 shows how isolated domain specific data stores can be consolidated into a single network attached data store.

Figure 9:
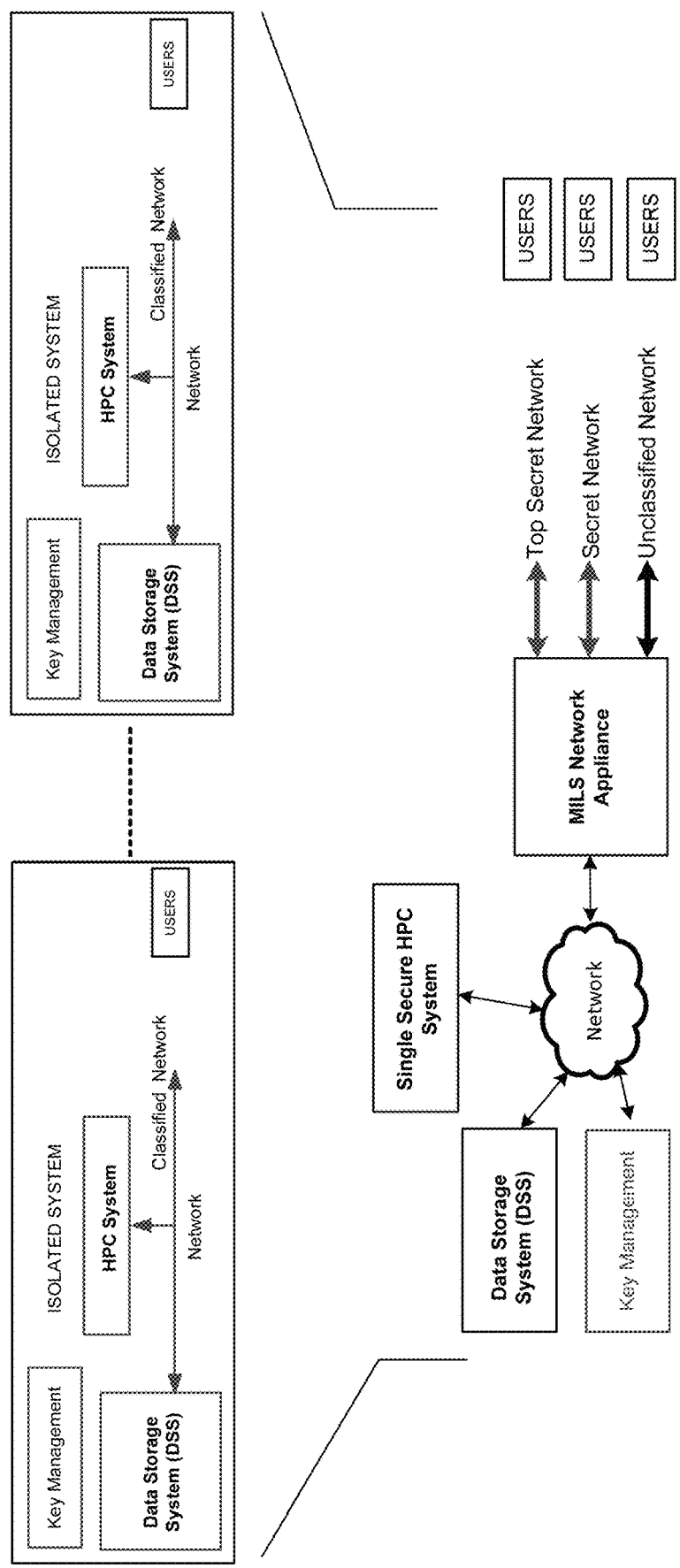

FIG. 9 shows how multiple complete security domain specific isolated HPC systems can be consolidated to a single system using MCM technology as described herein.

VARIATIONS

In one embodiment, a networked computing system (e.g., including HPC and DSS as described above) includes: a plurality of data input ports, each port corresponding to one of a plurality of different levels of security classification; a security device (e.g., an MCM as described above), configured for cryptographic processing, coupled to receive incoming data from each of the plurality of input ports, wherein the incoming data includes first data having a first classification level, wherein the security device comprises a plurality of cryptographic modules, wherein each cryptographic module is configured to perform security processing for at least one of the different levels of security classification, and wherein each of the cryptographic modules comprises a cryptographic engine configured for data processing using a systolic array; and a key manager configured to select a first set of keys from a plurality of key sets, each of the key sets corresponding to one of the different levels of security classification, wherein the first set of keys is used by the security device to encrypt the first data; wherein the security device is further configured to send the encrypted first data to a storage device.

In one embodiment, each multiple cryptographic module (MCM) as implemented above (e.g., each MCM in FIGS. 1-3) is a cryptographic module as described in U.S. Non-Provisional application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, the entire contents of which application is incorporated by reference as if fully set forth herein.

In one embodiment, each security device above is configured for use in the HPC system and/or data storage system as described herein (e.g., as described for an MCM above). Each security device is configured to provide a different security level for each of several domains. Each domain is defined by a key manager.

In one embodiment, data and/or file objects are securely communicated over the Ethernet network in the HPC system and data storage system as described in U.S. Non-Provisional application Ser. No. 15/688,743, filed Aug. 28, 2017, entitled "CLOUD STORAGE USING ENCRYPTION GATEWAY WITH CERTIFICATE AUTHORITY IDENTIFICATION," by Anderson et al., the entire contents of which application is incorporated by reference as if fully set forth herein.

In one embodiment, the MILS network appliance with different security domains and the use of the MCM above can be used with or in a system as described in U.S. Non-Provisional application Ser. No. 15/332,059, filed Oct. 24, 2016, entitled "MULTI-INDEPENDENT LEVEL SECURE (MILS) STORAGE ENCRYPTION," by Richard J. Takahashi, the entire contents of which application is incorporated by reference as if fully set forth herein.

In one embodiment, the MILS network appliance with different security domains and the use of the MCM above can be used with or in a system as described in U.S. Non-Provisional application Ser. No. 14/198,097, filed Mar. 5, 2014, entitled "MULTI-LEVEL INDEPENDENT SECURITY ARCHITECTURE," by Richard J. Takahashi, the entire contents of which application is incorporated by reference as if fully set forth herein.

Closing

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IoT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In some embodiments, each MCM is a computing device, or includes a processing device. Other components of the HPC or DSS system can be implemented using computing devices.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:
1. A system comprising:
a plurality of compute nodes;
a plurality of cryptographic modules, each module configured to encrypt communications in a networked system, and each module configured to support different security levels for multiple domains; and a data storage system configured to store encrypted data for each of the compute nodes, wherein each compute node is configured to access the data storage system via a respective one of the cryptographic modules.

2. The system of claim 1, wherein each domain is defined by a key manager.

3. The system of claim 1, wherein each compute node is configured to serve one of the multiple domains.

4. The system of claim 1, wherein the cryptographic modules maintain cryptographic isolation between the compute nodes.

5. The system of claim 1, wherein each of the compute nodes is configured to perform transport encryption for communicating with other ones of the compute nodes, and to perform data at rest encryption for storing data in the data storage system.

6. The system of claim 5, further comprising a key/node manager configured to manage keys for the transport encryption and the data at rest encryption.

7. The system of claim 5, wherein the transport encryption provides a secure link to the other ones of the compute nodes at a same security level.

8. The system of claim 1, further comprising a key/node manager configured to provision each of the cryptographic modules to one of the different security levels.

9. A system comprising:
a plurality of compute nodes:
a plurality of cryptographic modules to provide multi-independent level security, wherein each cryptographic module is configured to enable computation of different security domains; and
a data storage system configured to store encrypted data for each of the compute nodes, wherein each compute node is configured to access the data storage system via a respective one of the cryptographic modules.

10. The system of claim 9, wherein the computation of different security domains is enabled with associated security level keys from at least one key manager.

11. The system of claim 9, wherein the system is configured for dynamic re-allocation to at least one different security level domain.

12. The system of claim 9, wherein each compute node is configured to serve one of the different security domains.

13. The system of claim 9, wherein the cryptographic modules maintain cryptographic isolation between the compute nodes.

14. A system comprising:
a plurality of compute nodes, each node configured to serve one of multiple different security domains;
at least one cryptographic module configured to maintain cryptographic isolation between the compute nodes; and
a data store coupled to the compute nodes, wherein each node is configured to access the data store to retrieve data for the security domain served by the node, and the data store is accessible to the at least one cryptographic module.

15. The system of claim 14, wherein at least one compute node of the compute nodes is configured for reallocation to a new security domain.

16. The system of claim 14, wherein the at least one cryptographic module comprises a cryptographic engine configured for data processing using a systolic array.

17. The system of claim 14, further comprising a key manager configured to select a set of keys from multiple key sets for performing encryption by the at least one cryptographic module.

18. The system of claim 17, wherein each set of the multiple key sets corresponds to one of the different security domains.

19. The system of claim 14, wherein the at least one cryptographic module maintains cryptographic isolation between data elements stored in the data store.

20. The system of claim 14, wherein the data store is configured to store data for at least two of the different security domains.

* * * * *